US012579451B2

(12) United States Patent
Hirakawa et al.

(10) Patent No.: US 12,579,451 B2
(45) Date of Patent: Mar. 17, 2026

(54) MINIMAL UNSATISFIABLE SET DETECTION APPARATUS, MINIMAL UNSATISFIABLE SET DETECTION METHOD, AND COMPUTER-READABLE RECORDING MEDIUM

(71) Applicant: NEC Corporation, Tokyo (JP)

(72) Inventors: Shiho Hirakawa, Tokyo (JP); Yoichi Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1122 days.

(21) Appl. No.: 17/620,805

(22) PCT Filed: Jun. 27, 2019

(86) PCT No.: PCT/JP2019/025593
§ 371 (c)(1),
(2) Date: Dec. 20, 2021

(87) PCT Pub. No.: WO2020/261485
PCT Pub. Date: Dec. 30, 2020

(65) Prior Publication Data
US 2022/0358378 A1     Nov. 10, 2022

(51) Int. Cl.
*G06N 5/04*          (2023.01)

(52) U.S. Cl.
CPC ..................................... *G06N 5/04* (2013.01)

(58) Field of Classification Search
CPC ...................................................... G06N 5/04
See application file for complete search history.

(56) References Cited

U.S. PATENT DOCUMENTS

2014/0249875 A1     9/2014  Junker et al.
2019/0087509 A1     3/2019  Tago et al.

FOREIGN PATENT DOCUMENTS

JP          H06-195220 A       7/1994
JP          2015-502620 A      1/2015
(Continued)

OTHER PUBLICATIONS

Zhang, Jianmin, Sikun Li, and Shengyu Shen. "Extracting minimum unsatisfiable cores with a greedy genetic algorithm." In Australasian Joint Conference on Artificial Intelligence, pp. 847-856. Berlin, Heidelberg: Springer Berlin Heidelberg, 2006. (Year: 2006).*
(Continued)

*Primary Examiner* — Casey R. Garner
(74) *Attorney, Agent, or Firm* — Sughrue Mion, PLLC

(57)          ABSTRACT
A minimal unsatisfiable set detection apparatus, which detects a minimal set from a set of observed events that are determined to be inconsistent with a knowledge base, includes a decision graph acquisition unit 31 that acquires a decision graph that outputs a boolean value of an observed event from the knowledge base, an observed event acquisition unit 32 that acquires a plurality of observed events determined to be inconsistent with the knowledge base, a minimal set covering derivation unit 33 that obtains a minimal set covering by converting a plurality of observed events, which are acquired by the observed event acquisition unit 32, into a minimal set covering problem using the decision graph, and an output unit 34 that outputs a calculation result by the minimal set covering derivation unit 33.

12 Claims, 12 Drawing Sheets

(56)             References Cited

FOREIGN PATENT DOCUMENTS

| | | |
|---|---|---|
| JP | 2017-054168 A | 3/2017 |
| JP | 2019-056960 A | 4/2019 |

OTHER PUBLICATIONS

Huang, Yu-Xuan, Zequn Sun, Guangyao Li, Xiaobin Tian, Wang-Zhou Dai, Wei Hu, Yuan Jiang, and Zhi-Hua Zhou. "Enabling Abductive Learning to Exploit Knowledge Graph." In IJCAI, pp. 3839-3847. 2023. (Year: 2023).*

Aravindan, Chandrabose, and Phan Minh Dung. "Knowledge base dynamics, abduction, and database updates." Journal of Applied Non-Classical Logics 5, No. 1 (1995): 51-76. (Year: 1995).*

Haifani, Fajar. "On a notion of abduction and relevance for first-order logic clause sets." (2022). (Year: 2022).*

International Search Report for PCT Application No. PCT/JP2019/025593, mailed on Aug. 27, 2019.

English translation of Written opinion for PCT Application No. PCT/JP2019/025593, mailed on Aug. 27, 2019.

* cited by examiner

Fig.9

| OBSERVED EVENT | PATH NUMBER |
|:---:|:---:|
| U | – |
| ¬S | (2) , (3) |
| W | – |
| ¬T | (1) |
| P | (4) |

MINIMAL UNSATISFIABLE SET DETECTION APPARATUS, MINIMAL UNSATISFIABLE SET DETECTION METHOD, AND COMPUTER-READABLE RECORDING MEDIUM

CROSS REFERENCE TO RELATED APPLICATIONS

This application is a National Stage of Application No. PCT/JP2019/25593 filed Jun. 27, 2019 the disclosure of which is incorporated herein in its entirety by reference.

TECHNICAL FIELD

The present invention relates to a minimal unsatisfiable set detection apparatus and a minimal unsatisfiable set detection method for detecting contradictions in a derivation of hypotheses by applying inferential knowledge to observed events, and further relates to a computer-readable recording medium for realizing the apparatus and the method.

BACKGROUND ART

Conventionally, a method called abduction has been known as a type of logical inference. Abduction is a method of deriving the best hypothesis from given knowledge (rules) and observed events (obtained facts). For example, it is assumed that "A=>B (if A is true, then B is true)" exists as knowledge, and "B is true" is acquired as an observed event. In this case, "A is true" is obtained as a hypothesis by inference. Conventionally, a technique using a BDD (Binary Decision Diagram), which is a data structure expressing a logical function, for the abduction has been proposed (see, for example, Patent Document 1).

LIST OF RELATED ART DOCUMENTS

Patent Document

Patent Document 1: Japanese Patent Laid-Open Publication No. 2017-54168

SUMMARY OF INVENTION

Problems to be Solved by the Invention

In the abduction, if the observed event is inconsistent with the knowledge, it may not be possible to derive the correct hypothesis. Therefore, various methods for detecting whether the observed event is inconsistent with the knowledge have been proposed. In addition, it is desired to improve the reliability of the detection results. In addition, it is desired to improve the reliability of the detection results.

An example of object of the present invention is to provide a minimal unsatisfiable set detection apparatus, a minimal unsatisfiable set detection method and a computer-readable recording medium for detecting a minimal value of a set of observed events that are determined to be inconsistent with a knowledge base.

Means for Solving the Problems

In order to achieve the above object, a minimal unsatisfiable set detection apparatus in one aspect of the present invention detects a minimal set from a set of observed events that are determined to be inconsistent with a knowledge base, the minimal unsatisfiable set detection apparatus includes:

a decision graph acquisition means for acquiring a decision graph that outputs a boolean value of an observed event from the knowledge base, an observed event acquisition means for acquiring a plurality of observed events determined to be inconsistent with the knowledge base, a minimal set covering derivation means for obtaining a minimal set covering by converting a plurality of observed events, which are acquired by the observed event acquisition means, into a minimal set covering problem using the decision graph, and an output means for outputting a calculation result by the minimal set covering derivation means.

Further, in order to achieve the above object, a minimal unsatisfiable set detection method in one aspect of the present invention detects a minimal set from a set of observed events that are determined to be inconsistent with a knowledge base, the minimal unsatisfiable set detection method includes:

acquiring a decision graph that outputs a boolean value of an observed event from the knowledge base, acquiring a plurality of observed events determined to be inconsistent with the knowledge base, obtaining a minimal set covering by converting a plurality of observed events acquired into a minimal set covering problem using the decision graph, and outputting a result of obtaining the minimal set covering.

Further, in order to achieve the above object, a computer-readable recording medium according to an example aspect of the invention includes a program recorded thereon, the program including instructions that cause a computer, which detects a minimal set from a set of observed events that are determined to be inconsistent with a knowledge base, to execute:

acquiring a decision graph that outputs a boolean value of an observed event from the knowledge base, acquiring a plurality of observed events determined to be inconsistent with the knowledge base, obtaining a minimal set covering by converting a plurality of observed events acquired into a minimal set covering problem using the decision graph, and outputting a result of obtaining the minimal set covering.

Advantageous Effects of the Invention

As descried above, according to the present invention, with respect to the observed events that are determined to be inconsistent with the knowledge base, partial observation events directly linked to the inconsistency can be enumerated, and the inconsistency detection result can be refined.

BRIEF DESCRIPTION OF THE DRAWINGS

FIG. 9 is a diagram showing observed events and path numbers associated with the observed events.

EXAMPLE EMBODIMENTS

Hereinafter, a minimal unsatisfiable set detection apparatus, a minimal unsatisfiable set detection method, and a computer-readable recording medium according to the example embodiment of the present invention will be described with reference to the drawings.

[Apparatus Configuration]

Figure 1:
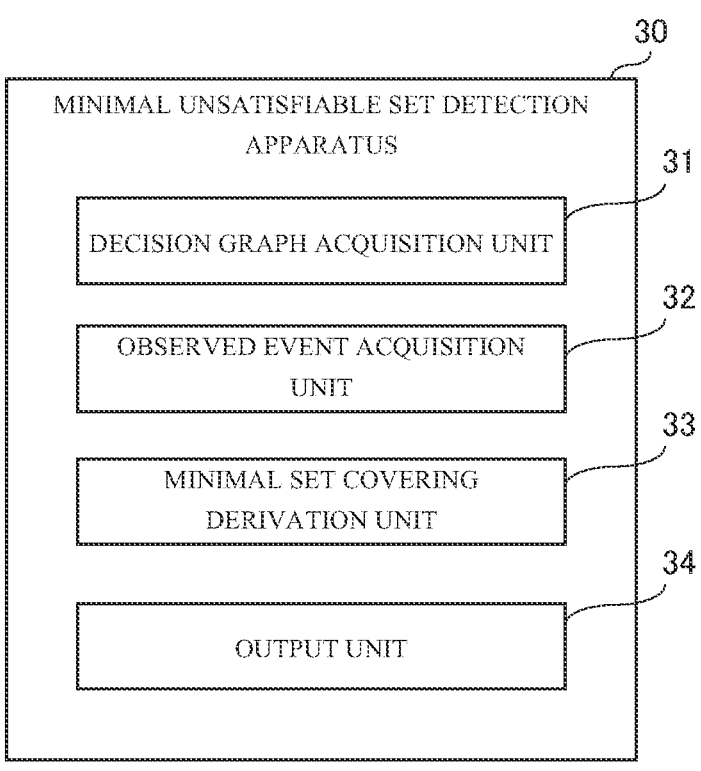
FIG. 1 is a diagram showing a configuration of a minimal unsatisfiable set detection apparatus according to an example embodiment.

First, a schematic configuration of the minimal unsatisfiable set detection apparatus according to the example embodiment will be described with reference to FIG. 1. FIG. 1 is a diagram showing a configuration of the minimal unsatisfiable set detection apparatus 30 according to the example embodiment.

The minimal unsatisfiable set detection apparatus 30 is an apparatus that detects a minimal set from a set of observed events that are determined to be inconsistent with a knowledge base. The minimal unsatisfiable set detection apparatus 30 includes a decision graph acquisition unit 31, an observed event acquisition unit 32, a minimal set covering derivation unit 33, and an output unit 34.

The decision graph acquisition unit 31 acquires a decision graph that outputs a boolean value of an observed event from the knowledge base.

The observed event acquisition unit 32 acquires a plurality of observed events determined to be inconsistent with the knowledge base.

The minimal set covering derivation unit 33 converts the plurality of observed events acquired by the observed event acquisition unit 32 into a minimal set covering problem using a decision graph, and obtains a minimal set covering.

The output unit 34 outputs the calculation result by the minimal set covering derivation unit 33.

According to the minimal unsatisfiable set detection apparatus 30, with respect to the observed events that are determined to be inconsistent with the knowledge base, partial observation events directly linked to the inconsistency can be enumerated, and the inconsistency detection result can be refined.

Subsequently, the configuration and functions of the minimal unsatisfiable set detection apparatus 30 according to the example embodiment will be specifically described.

The minimal unsatisfiable set detection apparatus 30 is included in a contradiction detection apparatus. The contradiction detection apparatus is an apparatus that detects observed events that are inconsistent with the knowledge base. The minimal unsatisfiable set detection apparatus 30 detects a minimal set from the observed events detected to be inconsistent by the contradiction detection apparatus. In the following description, the minimal unsatisfiable set detection apparatus 30 is assumed to be provided in the contradiction detection apparatus. However, the minimal unsatisfiable set detection apparatus 30 may be provided independently of the contradiction detection apparatus.

Figure 2:
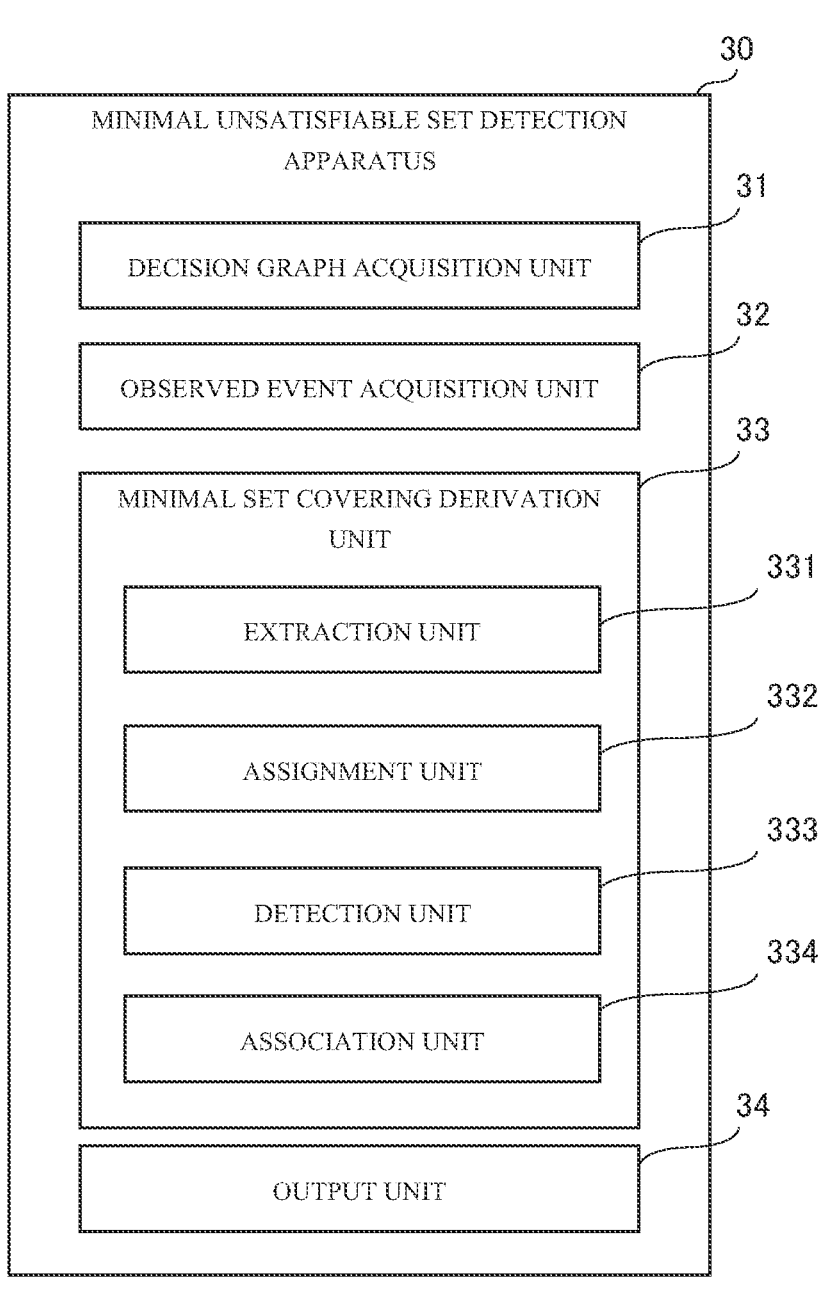
FIG. 2 is a block diagram specifically showing a configuration of the minimal unsatisfiable set detection apparatus according to the example embodiment.
Figure 3:
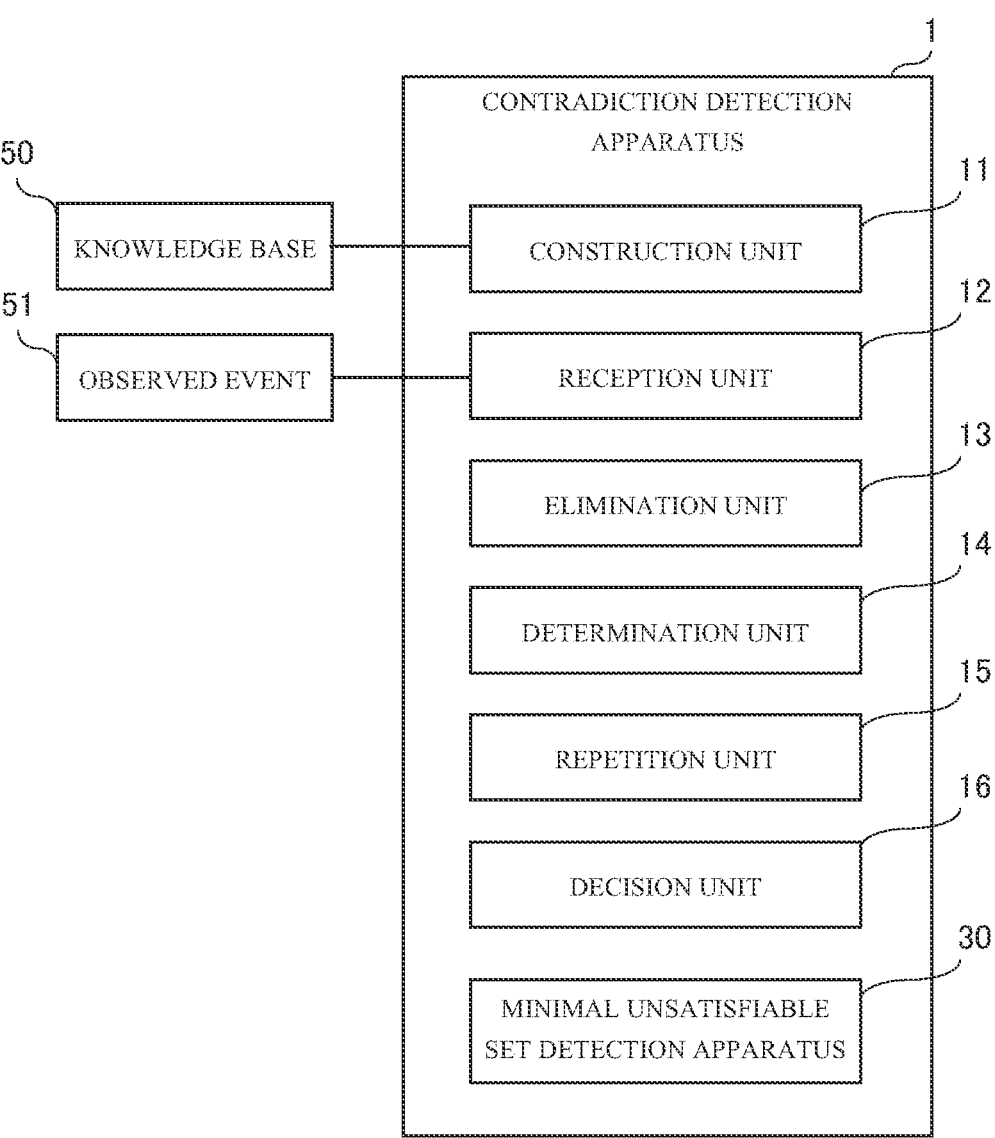
FIG. 3 is a block diagram specifically showing a configuration of a contradiction detection apparatus including the minimal unsatisfiable set detection apparatus.

FIG. 2 is a block diagram specifically showing the configuration of the minimal unsatisfiable set detection apparatus 30 according to the example embodiment. FIG. 3 is a block diagram specifically showing a configuration of a contradiction detection apparatus 1 including the minimal unsatisfiable set detection apparatus 30.

First, the contradiction detection apparatus 1 will be described. As shown in FIG. 3, the contradiction detection apparatus 1 includes a construction unit 11, a reception unit 12, an elimination unit 13, a determination unit 14, a repetition unit 15, a decision unit 16, and the minimal unsatisfiable set detection apparatus 30.

The construction unit 11 constructs the decision graph based on a knowledge base 50. The knowledge base 50 is data for performing the abduction. The knowledge base 50 is stored in a storage device not shown in the figure. The storage device may be provided outside the contradiction detection apparatus 1 or may be provided in the contradiction detection apparatus 1.

The knowledge base 50 is expressed, for example, by an implication relation rule of a first-order predicate logic formula. The knowledge base 50 is expressed in the form of, for example, "pre-state (premise)=>post-state (conclusion)". This form indicates that if the pre-state, which is the premise to be observed, is true, then the post-state, which is the inevitable conclusion, is derived. In this form, the "post-state" is a necessary condition for the "pre-state" to be true. The "pre-state" is a sufficient condition for the "post-state" to be true. The sufficient condition can also be expressed as a conjunction of multiple propositions. For example, the knowledge base 50 may be expressed as "pre-state (premise) ^action=>post-state".

Figure 4:
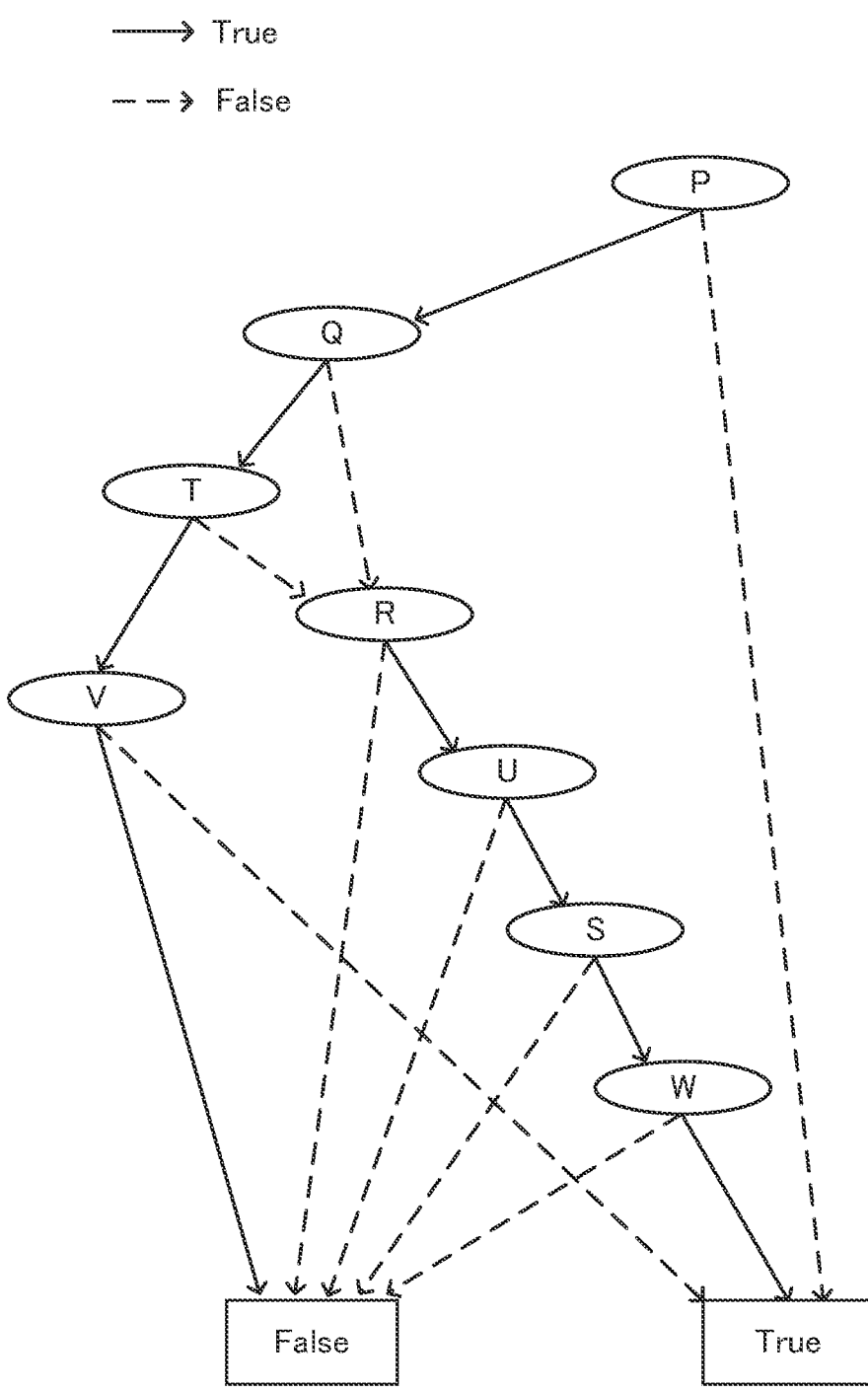
FIG. 4 is a diagram showing a decision graph constructed by a construction unit.

FIG. 4 is a diagram showing a decision graph constructed by the construction unit 11. The decision graph shown in FIG. 4 is a BDD (Binary Decision Diagram) that represents the knowledge base 50. This decision graph consists of nodes and edges. Each node is an event to be observed. Each edge connects a node to another node and represents a transition relationship between the nodes. In this decision graph, a root node is a node that has no parent node, and is node "P". In addition, leaf nodes are nodes that do not have any child nodes, and in FIG. 4, they are the "True" and "False" nodes. From this decision graph, a boolean value of an observed event 51, that is, "True" or "False" is derived. The decision graph may be a ZDD (Zero-suppressed Binary Decision Diagram) or SDD (Sentential Decision Diagram).

Note that, the construction unit 11 constructs a decision graph from a propositional logic formula generated by a grounding operation based on the Herbrand universe of the knowledge base 50. The Herbrand universe is a region where constants that can be assigned in the variables of each predicate are fixed for the first-order predicate logic formula. The grounding operation is a process of substituting the constants of the Herbrand universe into the first-order predicate logic formula so that it can be treated as a propositional logic formula.

For example, if there is a predicate called Eat (people, food), "people" and "food" are variables of the predicate. The Herbrand universe is "people={Andy, Bob, Cathy}", "food={Donuts, Eggs, Fish}" and so on. In this case, the grounding operation generates Eat (Andy, Donut), Eat (Andy, Egg), Eat (Cath, Fish) and the like as propositional logic formula.

Figure 5:
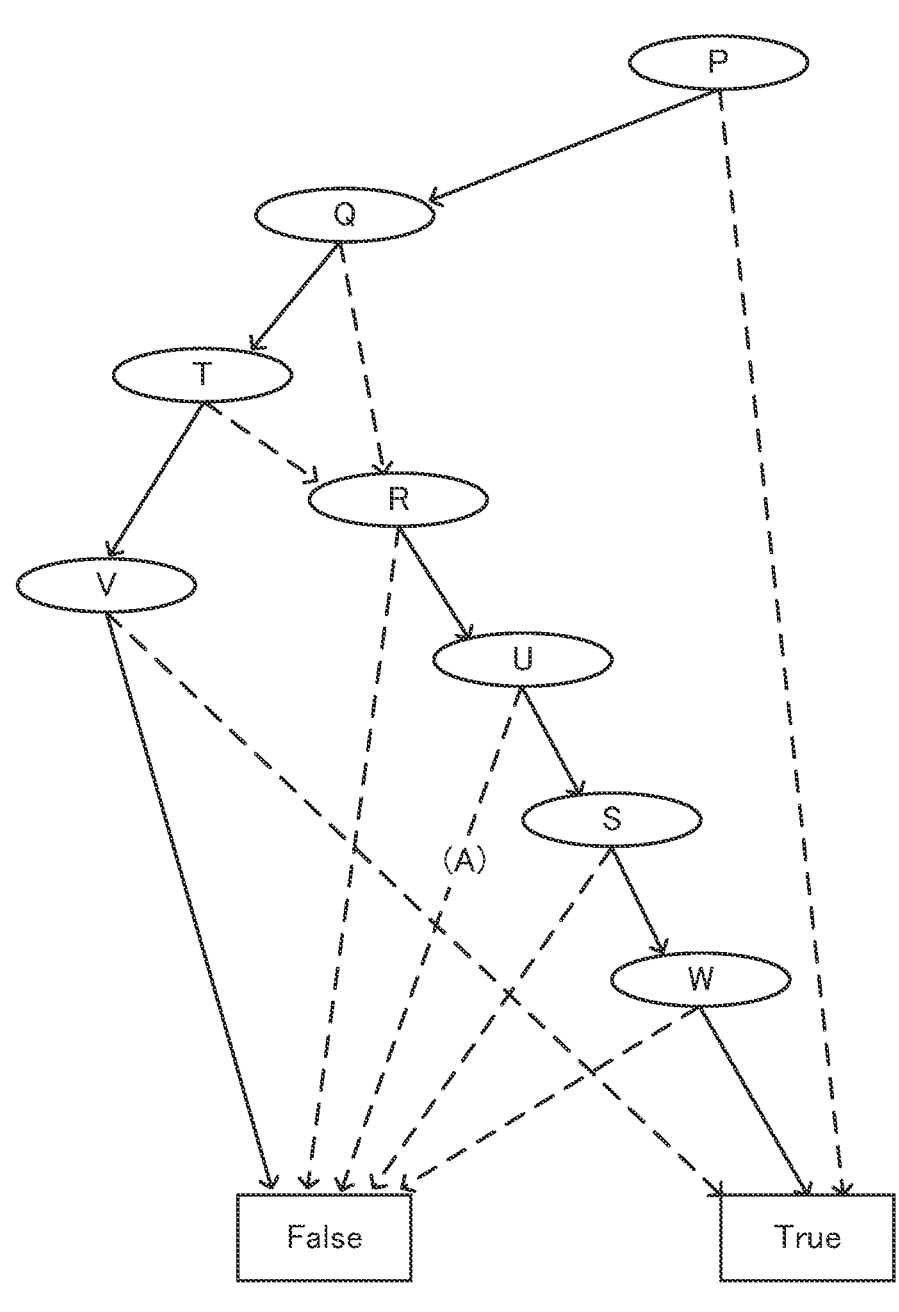
FIG. 5 is a diagram for explaining processing executed by a reception unit, an elimination unit, a determination unit, and a repetition unit.
Figure 6:
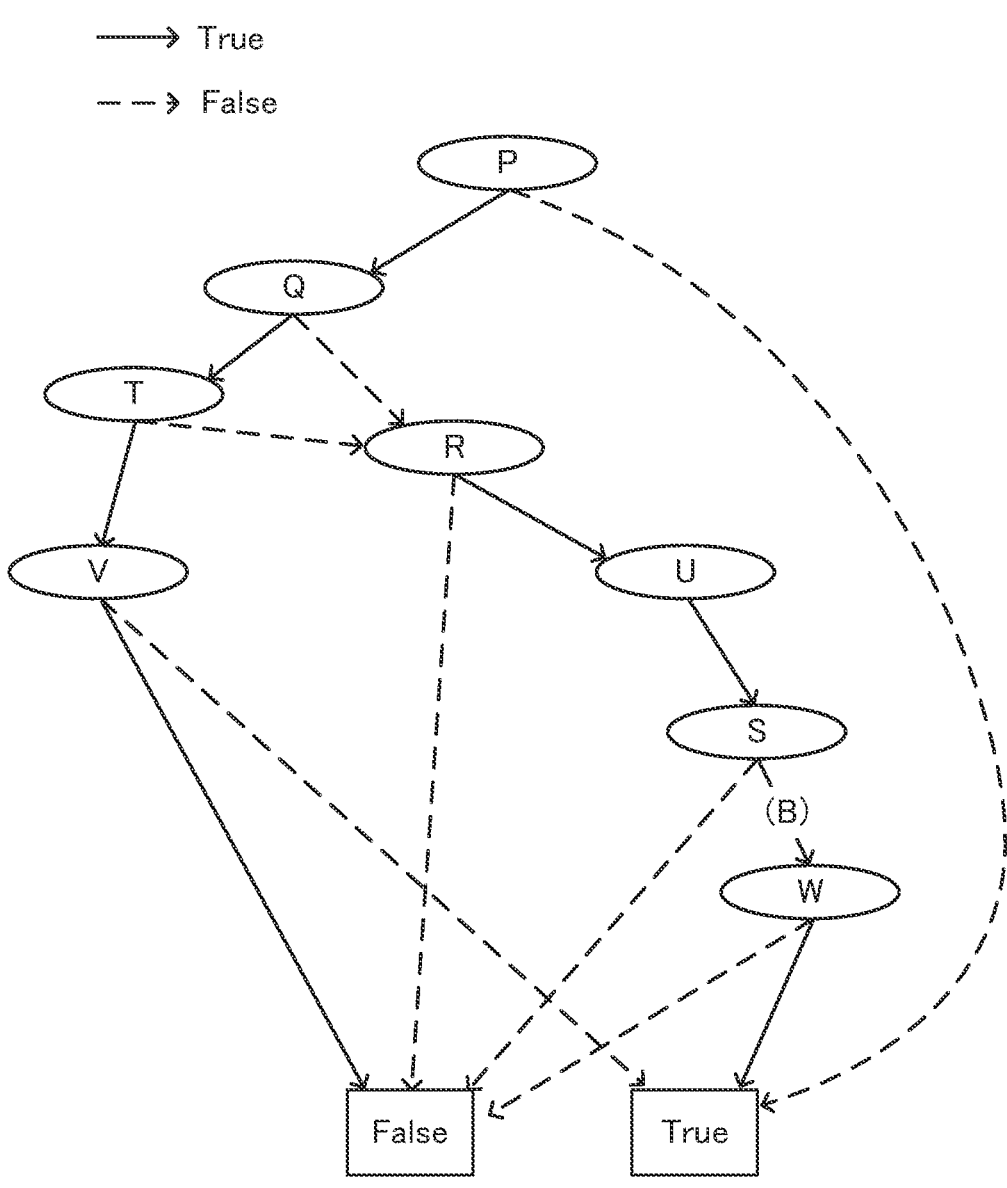
FIG. 6 is a diagram for explaining processing executed by the reception unit, the elimination unit, the determination unit, and the repetition unit.
Figure 7:
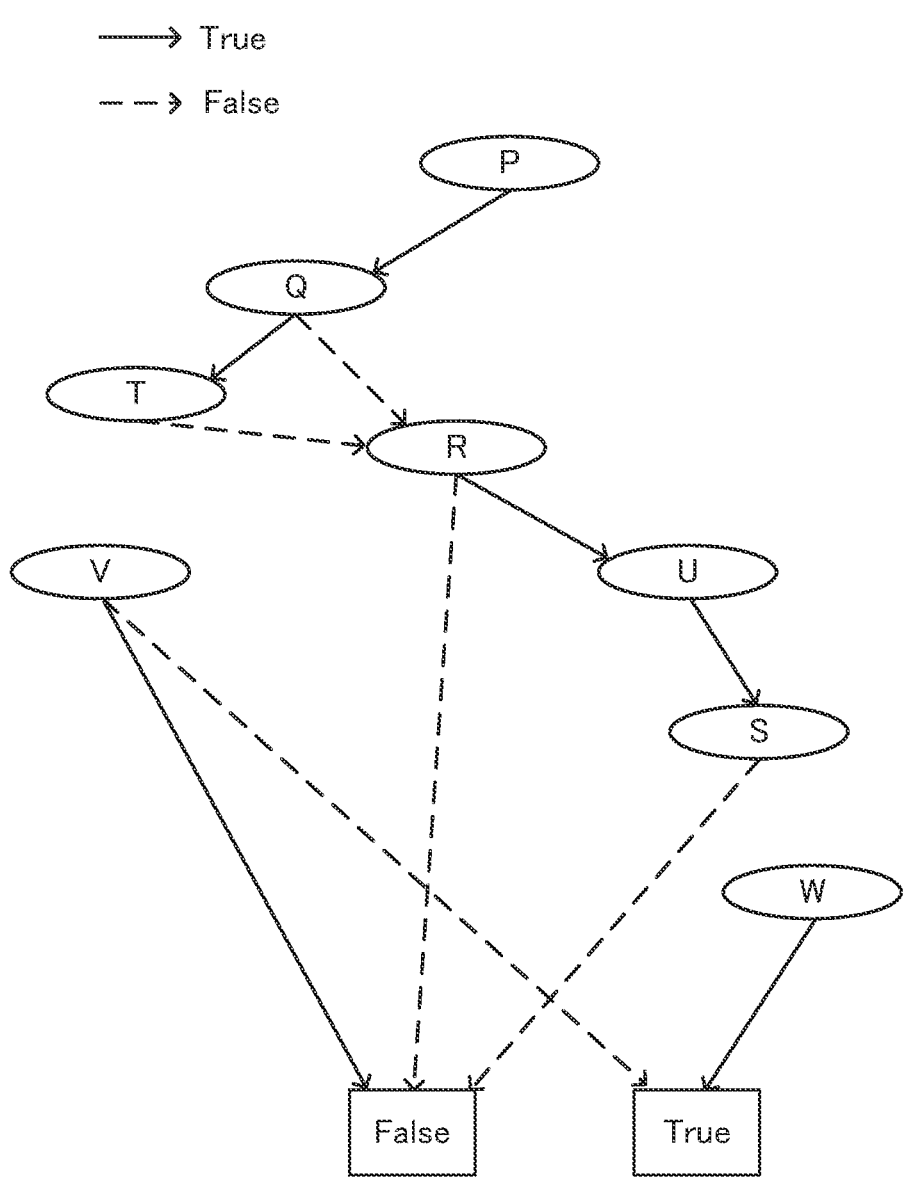
FIG. 7 is a diagram for explaining processing executed by the reception unit, the elimination unit, the determination unit, and the repetition unit.

With reference to FIGS. 5 to 7 and assuming that the events "U", "¬S", "W", "¬T" and "P" are observed in this order, the reception unit 12, the elimination unit 13, the determination unit 14, and the repetition unit 15 will be described. FIG. 5, FIG. 6 and FIG. 7 are diagrams for explaining processing executed by the reception unit 12, the elimination unit 13, the determination unit 14, and the repetition unit 15.

The reception unit 12 receives the observed event 51. The elimination unit 13 eliminates the edge, which transitions to a side denying the observed event 51, among the edges connected to the node corresponding to the observed event 51 received by the reception unit 12. The edge that transitions to the side denying the observed event 51 is, for example, when the observed event 51 is "U", the edge of "False" (the edge (A) in FIG. 5) connected to the node "U" corresponding to the observed event 51.

The determination unit 14 determines reachability in the decision graph after the edge is eliminated by the elimination unit 13. Reachability is the presence or absence of a first path from the root node to the leaf node "True" and a second path from the root node to the leaf node "False". The determination unit 14 determines that there is reachability when the first path and the second path exist, and determines that there is no reachability when the first path or the second path does not exist. In the decision graph shown in FIG. 5, even if the edge (A) is eliminated, the first path and the second path still exist. Therefore, the determination unit 14 determines that there is reachability.

When the determination unit 14 determines that there is reachability, the repetition unit 15 causes the reception unit 12, the elimination unit 13, and the determination unit 14 to execute the processing again. Specifically, the reception unit 12 receives "¬S", which is the next observed event 51. The elimination unit 13 eliminates the edge of "True" connected to the node "S" (the edge (B) in FIG. 6). The determination unit 14 determines the reachability in the decision graph after the edge is eliminated by the elimination unit 13.

FIG. 7 shows the decision graph after the elimination unit 13 eliminates the "False" edge connected to the node "P" in the case where the events "U", "¬S", "W", "¬T", and "P" are observed in this order. In the decision graph shown in FIG. 7, there is no first path from the root node to the leaf node "True". That is, the determination unit 14 determines that there is no reachability. The decision graph of FIG. 7 means that "False" is always output no matter what kind of event is observed thereafter.

Return to FIG. 2. When the determination unit 14 determines that there is no reachability, the decision unit 16 decides that the observed events 51 (events "U", "¬S", "W", "¬T", "P") received so far are inconsistent with the knowledge base.

The minimal unsatisfiable set detection apparatus 30 detects a minimal set from the observed events detected to be inconsistent by the decision unit 16. The minimal unsatisfiable set detection apparatus 30 includes a decision graph acquisition unit 31, an observed event acquisition unit 32, a minimal set covering derivation unit 33, and an output unit 34.

The decision graph acquisition unit 31 acquires the decision graph constructed by the construction unit 11.

The observed event acquisition unit 32 acquires a plurality of observed events 51 decided to be inconsistent with the knowledge base by the decision unit 16. In the example embodiment, the plurality of observed events 51 decided to be inconsistent are "U", "¬S", "W", "¬T", and "P".

The minimal set covering derivation unit 33 converts the plurality of observed events 51 acquired by the observed event acquisition unit 32 into a minimal set covering problem using a decision graph, and obtains a minimal set covering. The minimal set covering derivation unit 33 includes an extraction unit 331, an assignment unit 332, a detection unit 333, and an association unit 334.

The extraction unit 331 extracts all of the first paths from the root node to the leaf node "True" or the second paths from the root node to the leaf node "False" in the decision graph. The extraction unit 331 extracts all of the first or second paths for which it is determined that reachability does not exist. In the example embodiment, the determination unit 14 determines that there is no reachability of the first path. In this case, the extraction unit 331 extracts all of the first paths.

Figure 8:
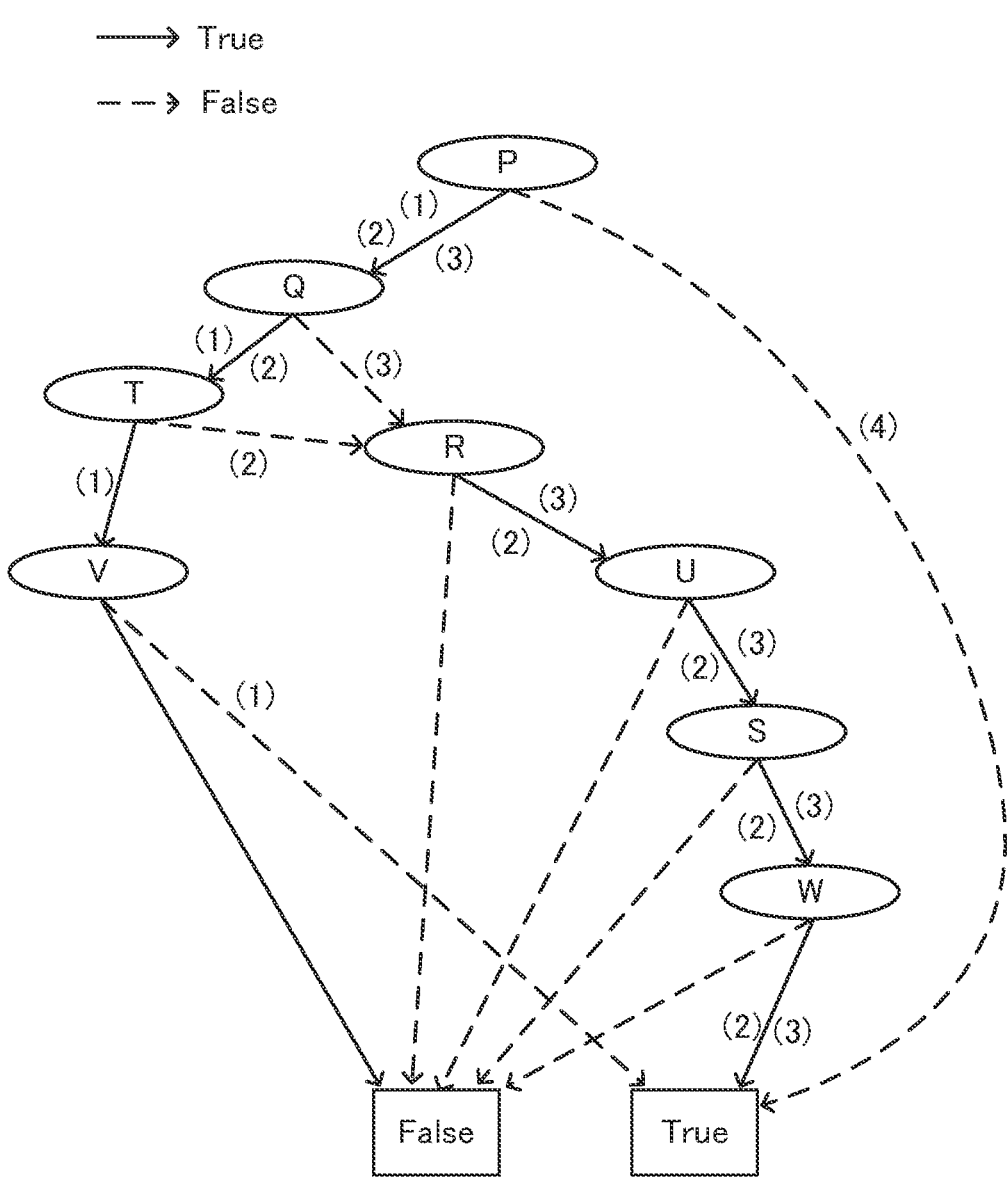
FIG. 8 is a diagram showing a decision graph to which path numbers are assigned.

The assignment unit 332 assigns path numbers to all the first paths extracted by the extraction unit 331. FIG. 8 is a diagram showing a decision graph to which path numbers are assigned. As shown in FIG. 8, the assignment unit 332 assigns the path numbers (1) to (4) to each edge constituting the first path.

The detection unit 333 detects which of the plurality of observed events 51 acquired by the observed event acquisition unit 32 is observed to block the first paths to which path numbers (1) to (4) are assigned. For example, when the observed event 51 is "¬S", the first paths with path numbers (2) and (3) are blocked.

The association unit 334 associates the observed event 51 detected by the detection unit 333 with the path number of the first path blocked by the observed event 51. FIG. 9 is a diagram showing observed events 51 and path numbers associated with the observed events 51.

The minimal set covering derivation unit 33 obtains the minimal set covering of all path numbers from the observed events 51 to which the path numbers are associated. That is, the minimal set covering derivation unit 33 finds the smallest combination of observed events 51 that satisfies all the path numbers (1) to (4). In the case of FIG. 9, the combination of the events "¬S", "¬T", and "P" satisfies all the path numbers (1) to (4). This means that the smallest combination of the observed events 51, which are inconsistent with the knowledge base 50, is "¬S", "¬T", and "P". In this way, the reliability of the contradiction detection can be improved by obtaining the minimal set covering from the plurality of observed events 51 that are determined to be inconsistent with the knowledge base 50.

The output unit 34 outputs the result of the minimal set covering obtained by the minimal set covering derivation unit 33. In the above example, the output unit 34 outputs the events "¬S", "¬T", and "P". Note that, the output unit 34 may output to a display device when the contradiction detection apparatus 1 or the minimal unsatisfiable set detection apparatus 30 includes the display device, for example.

[Apparatus Operations]

Figure 10:
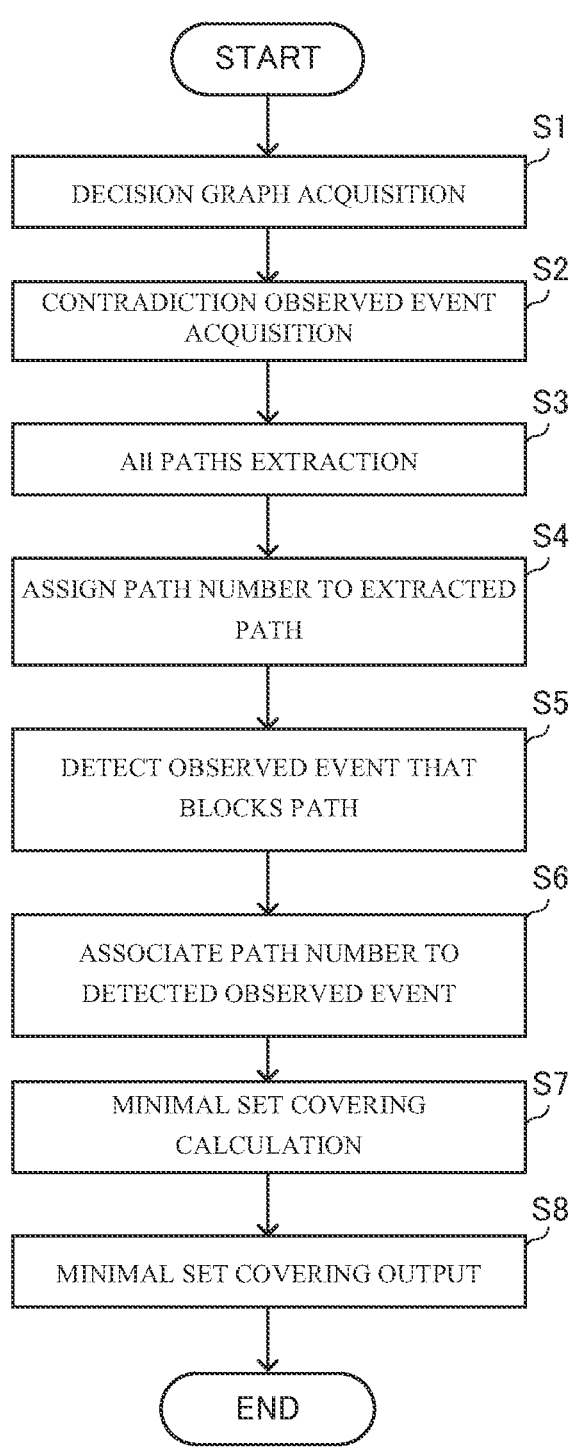
FIG. 10 is a flow diagram showing a process executed by the minimal unsatisfiable set detection apparatus.

Next, the operation of the minimal unsatisfiable set detection apparatus 30 according to the example embodiment will be described. FIG. 10 is a flow diagram showing a process executed by the minimal unsatisfiable set detection apparatus 30. In the example embodiment, the minimal unsatisfiable set detection method is implemented by operating the minimal unsatisfiable set detection apparatus 30. Therefore, the description of the minimal unsatisfiable set detection method in the example embodiment will be replaced with the following description of the operation of the minimal unsatisfiable set detection apparatus 30.

The decision graph acquisition unit 31 acquires the decision graph (S1). This decision graph is the decision graph shown in FIG. 4, which is constructed by the construction unit 11 of the contradiction detection apparatus 1. The observed event acquisition unit 32 acquires the plurality of observed events 51 determined to be inconsistent (S2). The plurality of observed events 51 are decided to be inconsistent by the decision unit 16 of the contradiction detection apparatus 1. In the decision graph acquired in S1, the extraction unit 331 of the minimal set covering derivation unit 33 extracts all of the first paths from the root node to the leaf node "True" or the second paths from the root node to the leaf node "False" (S3).

As shown in FIG. 8, the assignment unit 332 of the minimal set covering derivation unit 33 assigns path numbers to the first paths or the second paths extracted in S3 (S4). Next, the detection unit 333 of the minimal set covering derivation unit 33 detects the observed event 51, which blocks the first path to which the path number is assigned, from the plurality of observed events 51 (S5). Then, as shown in FIG. 9, the association unit 334 of the minimal set covering derivation unit 33 associates the observed event 51 detected in S5 with the path number of the path to be blocked (S6).

The minimal set covering derivation unit 33 calculates the minimal set covering of all path numbers from the observed events 51 to which the path numbers are associated in S6 (S7). Then, the output unit 34 outputs the calculated minimal set covering (S8).

Figure 11:
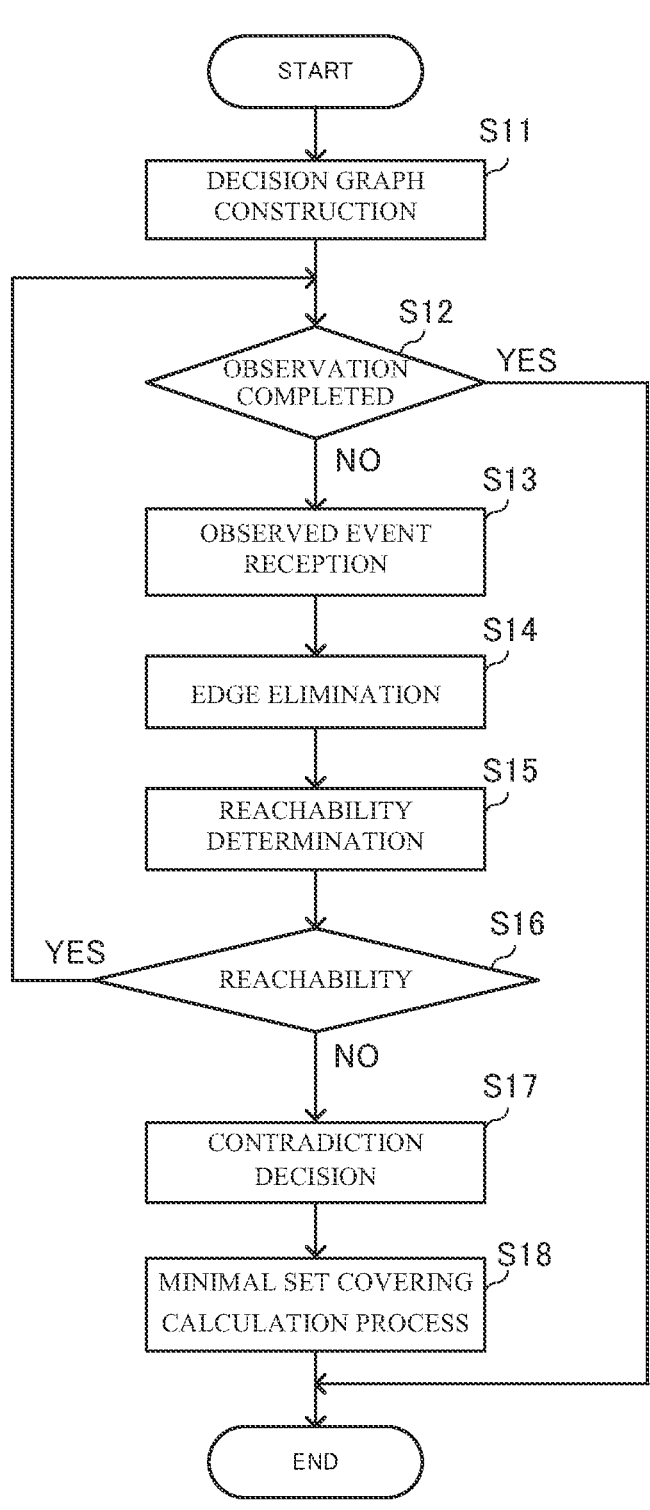
FIG. 11 is a flow diagram showing a process executed by the contradiction detection apparatus including the minimal unsatisfiable set detection apparatus.

Next, the operation of the contradiction detection apparatus 1 including the minimal unsatisfiable set detection apparatus 30 will be described. FIG. 11 is a flow diagram showing a process executed by t the contradiction detection apparatus 1 including the minimal unsatisfiable set detection apparatus 30.

The construction unit 11 acquires the knowledge base 50 and constructs a decision graph (S11). Next, the reception unit 12 determines whether the observation of the event is completed (S12), and if not (S12: NO), receives one observed event 51 (S13). When the observation of the event is completed (S12: YES), this process is completed.

In the decision graph constructed in S11, the elimination unit 13 eliminates the edge, which transitions to the side denying the observed event 51, among the edges connected to the node corresponding to the observed event 51 received in S13, as described in FIG. 5 (S14). Then, the determination unit 14 determines the reachability in the decision graph after the edge is eliminated in S14 (S15).

When there is reachability (S16: YES), the repetition unit 15 causes the reception unit 12, the elimination unit 13, and the determination unit 14 to repeatedly execute each of the processes S12 to S15. When there is no reachability (S16: NO), the decision unit 16 decides that the observed events 51 received so far is inconsistent with the knowledge base 50 (S17). Then, the minimal unsatisfiable set detection apparatus 30 executes the minimal set covering calculation process (S18). The minimal set covering calculation process is the process executed by the minimal unsatisfiable set detection apparatus 30 described with reference to FIG. 10.

[Program]

It is sufficient for the program according to the example embodiment to be a program that causes a computer to execute steps S1 to S8 shown in FIG. 10. The minimal unsatisfiable set detection apparatus 30 and the minimal unsatisfiable set detection method according to the example embodiment can be realized by installing this program in the computer and executing this program. In this case, a processor of the computer functions as the decision graph acquisition unit 31, the observed event acquisition unit 32, the minimal set covering derivation unit 33, and the output unit 34, and performs processing.

Also, the program according to the example embodiment may be executed by a computer system constituted by a plurality of computers. In this case, for example, each computer may function as any of the decision graph acquisition unit 31, the observed event acquisition unit 32, the minimal set covering derivation unit 33, and the output unit 34.

[Effect in the Example Embodiment]

According to the minimal unsatisfiable set detection apparatus 30 of the example embodiment, the reliability of observed events can be improved by enumerating observation sets that are inconsistent with the true and modifying the knowledge base.

[Physical Configuration]

Figure 12:
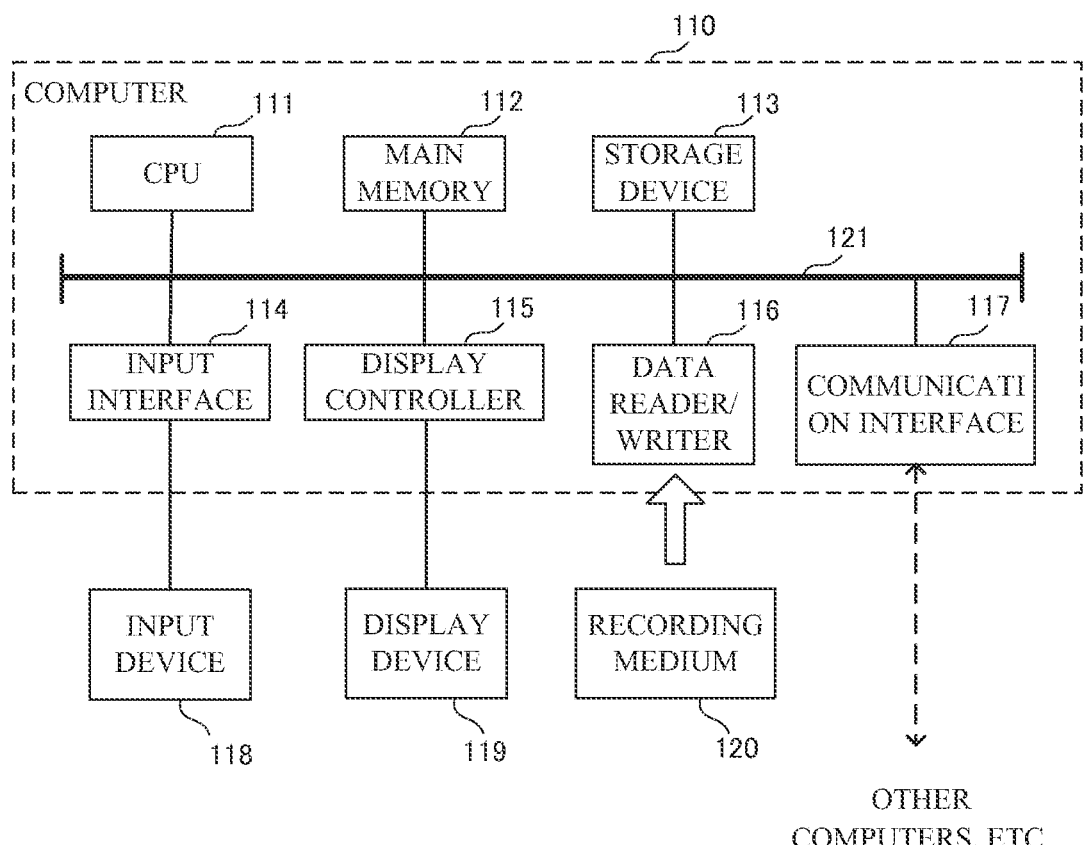
FIG. 12 is a block diagram showing an example of a computer that realizes the minimal unsatisfiable set detection apparatuses according to the example embodiment.

Here, a computer that realizes the minimal unsatisfiable set detection apparatus by executing the programs in the example embodiment will be described with reference to FIG. 12. FIG. 12 is a block diagram illustrating one example of a computer realizing the minimal unsatisfiable set detection apparatus in the example embodiment.

As illustrated in FIG. 12, a computer 110 includes a CPU 111, a main memory 112, a storage device 113, an input interface 114, a display controller 115, a data reader/writer 116, and a communication interface 117. These components are connected via a bus 121 so as to be capable of performing data communication with one another. Note that the computer 110 may include a graphics processing unit (GPU) or a field-programmable gate array (FPGA) in addition to the CPU 111 or in place of the CPU 111.

The CPU 111 loads the program (codes) in the example embodiment, which are stored in the storage device 113, onto the main memory 112, and performs various computations by executing these codes in a predetermined order. The main memory 112 is typically a volatile storage device such as a dynamic random access memory (DRAM). Furthermore, the program in the example embodiment is provided in a state such that the program is stored in a computer readable recording medium 120. Note that the program in the example embodiment may also be program that is distributed on the Internet, to which the computer 110 is connected via the communication interface 117.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading out of the program from the recording medium 120 and the writing of results of processing in the computer 110 to the recording medium 120. The communication interface 117 mediates data transmission between the CPU 111 and other computers.

Furthermore, specific examples of the recording medium 120 include a general-purpose semiconductor storage device such as a Compact Flash (registered trademark, CF) card or a Secure Digital (SD) card, a magnetic recording medium such as a flexible disk, and an optical recording medium such as a compact disk read-only memory (CD-ROM).

Note that the minimal unsatisfiable set detection apparatus in the example embodiment can also be realized by using pieces of hardware corresponding to the respective units, rather than using a computer on which the program is installed. Furthermore, a portion of the c minimal unsatisfiable set detection apparatus may be realized by using a program, and the remaining portion of the minimal unsatisfiable set detection apparatus may be realized by using hardware.

While a part of or the entirety of the above-described example embodiment can be expressed by (Supplementary note 1) to (Supplementary note 12) described in the following, the invention is not limited to the following description.

(Supplementary Note 1)

A minimal unsatisfiable set detection apparatus that detects a minimal set from a set of observed events that are determined to be inconsistent with a knowledge base, the apparatus comprising:

a decision graph acquisition means for acquiring a decision graph that outputs a boolean value of an observed event from the knowledge base, an observed event acquisition means for acquiring a plurality of observed events determined to be inconsistent with the knowledge base, a minimal set covering derivation means for obtaining a minimal set covering by converting a plurality of observed events, which are acquired by the observed event acquisition means, into a minimal set covering problem using the decision graph, and an output means for outputting a calculation result by the minimal set covering derivation means.

(Supplementary Note 2)

The minimal unsatisfiable set detection apparatus according to Supplementary note 1, wherein the minimal set covering derivation means comprises an extraction means for extracting all first paths from a root node to true or second paths from the root node to false in the decision graph, and obtains a minimal set covering of observed events, which block the first path or the second path extracted by the extraction means, from the plurality of observed events.

(Supplementary Note 3)

The minimal unsatisfiable set detection apparatus according to Supplementary note 2, wherein the minimal set covering derivation means comprises:

an assignment means for assigning path numbers to all of the first paths or the second paths extracted by the extraction means, a detection means for detecting an observed event, which block the first path or the second path, from the plurality of observed events, and an association means for associating an observed event, which is detected by the detection means, with a path number of the first path or the second path blocked by the observed event, and wherein the minimal set covering derivation means obtains a minimal set covering of all path numbers assigned by the assignment means from observed events to which path numbers are associated by the association means.

(Supplementary Note 4)

The minimal unsatisfiable set detection apparatus according to any one of Supplementary notes 1 to 3, wherein the decision graph is constructed by a grounding operation based on Herbrand universe of the knowledge base.

(Supplementary Note 5)

A minimal unsatisfiable set detection method that detects a minimal set from a set of observed events that are determined to be inconsistent with a knowledge base, the method comprising:

acquiring a decision graph that outputs a boolean value of an observed event from the knowledge base, acquiring a plurality of observed events determined to be inconsistent with the knowledge base, obtaining a minimal set covering by converting a plurality of observed events acquired into a minimal set covering problem using the decision graph, and outputting a result of obtaining the minimal set covering.

(Supplementary Note 6)

The minimal unsatisfiable set detection method according to Supplementary note 5, wherein when obtaining the minimal set covering:

extracting all first paths from a root node to true or second paths from the root node to false in the decision graph, and obtaining a minimal set covering of observed events, which block the first path or the second path extracted, from the plurality of observed events.

(Supplementary Note 7)

The minimal unsatisfiable set detection method according to Supplementary note 6, wherein when obtaining the minimal set covering:

assigning path numbers to all of the first paths or the second paths extracted, detecting an observed event, which block the first path or the second path, from the plurality of observed events, associating an observed event detected with a path number of the first path or the second path blocked by the observed event, and obtaining a minimal set covering of all assigned path numbers from observed events to which path numbers are associated.

(Supplementary Note 8)

The minimal unsatisfiable set detection method according to any one of Supplementary notes 5 to 7, wherein the decision graph is constructed by a grounding operation based on Herbrand universe of the knowledge base.

(Supplementary Note 9)

A computer-readable recording medium that includes recorded thereon, a program including instructions that cause a computer, which detects a minimal set from a set of observed events that are determined to be inconsistent with a knowledge base, to execute:

acquiring a decision graph that outputs a boolean value of an observed event from the knowledge base, acquiring a plurality of observed events determined to be inconsistent with the knowledge base, obtaining a minimal set covering by converting a plurality of observed events acquired into a minimal set covering problem using the decision graph, and outputting a result of obtaining the minimal set covering.

11

(Supplementary Note 10)

The computer-readable recording medium according to Supplementary note 9, wherein when obtaining the minimal set covering:

extracting all first paths from a root node to true or second paths from the root node to false in the decision graph, and obtaining a minimal set covering of observed events, which block the first path or the second path extracted, from the plurality of observed events.

(Supplementary Note 11)

The computer-readable recording medium according to Supplementary note 10, wherein when obtaining the minimal set covering:

assigning path numbers to all of the first paths or the second paths extracted, detecting an observed event, which block the first path or the second path, from the plurality of observed events, associating an observed event detected with a path number of the first path or the second path blocked by the observed event, and obtaining a minimal set covering of all assigned path numbers from observed events to which path numbers are associated.

(Supplementary Note 12)

The computer-readable recording medium according to any one of Supplementary notes 9 to 11, wherein the decision graph is constructed by a grounding operation based on Herbrand universe of the knowledge base.

INDUSTRIAL APPLICABILITY

As described above, the present invention is useful in in the field of deriving hypotheses by applying inferential knowledge to observed events.

REFERENCE SIGNS LIST

1 Contradiction detection apparatus
11 Construction unit
12 Reception unit
13 Elimination unit
14 Determination unit
15 Repetition unit
16 Decision unit
17 Grounding operation unit
18 Output unit
30 Minimal unsatisfiable set detection apparatus
31 Decision graph acquisition unit
32 Observed event acquisition unit
33 Minimal set covering derivation unit
34 Output unit
331 Extraction unit
332 Assignment unit
333 Detection unit
334 Association unit

What is claimed is:

1. A minimal unsatisfiable set detection apparatus configured to detect a minimal set from a set of observed events that are determined to be inconsistent with a knowledge base, the apparatus comprising:

a memory configured to store instructions; and
a processor configured to execute the instructions to:

acquire a decision graph that outputs a boolean value of an observed event from the knowledge base, wherein the decision graph is one of a Binary Decision

12

Diagram (BDD), a Zero-suppressed BDD (ZDD), and a Sentential Decision Diagram (SDD);

acquire a plurality of observed events determined to be inconsistent with the knowledge base;

obtain a minimal set covering by converting the plurality of acquired observed events, into a minimal set covering problem using the decision graph, wherein the obtain the minimal set covering comprises:

extracting all paths in the decision graph from a root node to a leaf node representing a specific boolean value, the paths being rendered unreachable due to the plurality of observed events;

assigning a unique path number to each of the extracted paths;

for each of the plurality of observed events, detecting which of the extracted paths are blocked by said observed event and associate the observed event with the path numbers of the blocked paths; and identifying a smallest combination of the observed events that collectively covers all of the assigned path numbers as the minimal set covering; and output a calculation result by the minimal set covering.

2. The minimal unsatisfiable set detection apparatus according to claim 1, wherein the obtain the minimal set covering comprises extracting all first paths from a root node to true or second paths from the root node to false in the decision graph, and obtaining a minimal set covering of observed events, which block the extracted first path or the extracted second path, from the plurality of observed events.

3. The minimal unsatisfiable set detection apparatus according to claim 2, wherein the obtain the minimal set covering comprises:

assigning path numbers to all of the extracted first paths or the extracted second paths;

detecting an observed event, which blocks the extracted first path or the extracted second path, from the plurality of observed events; and associating an observed event, which is detected, with a path number of the first path or the second path blocked by the observed event, and wherein the obtain the minimal set covering further comprises obtaining a minimal set covering of all path numbers assigned from observed events to which path numbers are associated.

4. The minimal unsatisfiable set detection apparatus according to claim 1, wherein the decision graph is constructed by a grounding operation based on Herbrand universe of the knowledge base.

5. A minimal unsatisfiable set detection method that detects a minimal set from a set of observed events that are determined to be inconsistent with a knowledge base, the method comprising:

acquiring a decision graph that outputs a boolean value of an observed event from the knowledge base, wherein the decision graph is one of a Binary Decision Diagram (BDD), a Zero-suppressed BDD (ZDD), and a Sentential Decision Diagram (SDD);

acquiring a plurality of observed events determined to be inconsistent with the knowledge base;

obtaining a minimal set covering by converting the plurality of acquired observed events into a minimal set covering problem using the decision graph, wherein the obtaining the minimal set covering comprises:

extracting all paths in the decision graph from a root node to a leaf node representing a specific boolean value, the paths being rendered unreachable due to the plurality of observed events;

assigning a unique path number to each of the extracted paths;

for each of the plurality of observed events, detecting which of the extracted paths are blocked by said observed event and associate the observed event with the path numbers of the blocked paths; and identifying a smallest combination of the observed events that collectively covers all of the assigned path numbers as the minimal set covering; and outputting a result of the obtaining the minimal set covering.

6. The minimal unsatisfiable set detection method according to claim 5, wherein the obtaining the minimal set covering comprises:

extracting all first paths from a root node to true or second paths from the root node to false in the decision graph; and obtaining a minimal set covering of observed events, which block the first path or the second path extracted, from the plurality of observed events.

7. The minimal unsatisfiable set detection method according to claim 6, wherein the obtaining the minimal set covering comprises:

assigning path numbers to all of the first paths or the second paths extracted;

detecting an observed event, which block the first path or the second path, from the plurality of observed events;

associating an observed event detected with a path number of the first path or the second path blocked by the observed event; and obtaining a minimal set covering of all assigned path numbers from observed events to which path numbers are associated.

8. The minimal unsatisfiable set detection method according to claim 5, wherein the decision graph is constructed by a grounding operation based on Herbrand universe of the knowledge base.

9. A non-transitory computer-readable recording medium that includes recorded thereon, a program including instructions that cause a computer, which detects a minimal set from a set of observed events that are determined to be inconsistent with a knowledge base, to execute:

acquiring a decision graph that outputs a boolean value of an observed event from the knowledge base, wherein the decision graph is one of a Binary Decision Diagram (BDD), a Zero-suppressed BDD (ZDD), and a Sentential Decision Diagram (SDD);

acquiring a plurality of observed events determined to be inconsistent with the knowledge base;

obtaining a minimal set covering by converting the plurality of acquired observed events into a minimal set covering problem using the decision graph, wherein the obtaining the minimal set covering comprises:

extracting all paths in the decision graph from a root node to a leaf node representing a specific boolean value, the paths being rendered unreachable due to the plurality of observed events;

assigning a unique path number to each of the extracted paths;

for each of the plurality of observed events, detecting which of the extracted paths are blocked by said observed event and associate the observed event with the path numbers of the blocked paths; and identifying a smallest combination of the observed events that collectively covers all of the assigned path numbers as the minimal set covering; and outputting a result of the obtaining the minimal set covering.

10. The non-transitory computer-readable recording medium according to claim 9, wherein the obtaining the minimal set covering comprises:

extracting all first paths from a root node to true or second paths from the root node to false in the decision graph; and obtaining a minimal set covering of observed events, which block the first path or the second path extracted, from the plurality of observed events.

11. The non-transitory computer-readable recording medium according to claim 10, wherein the obtaining the minimal set covering comprises:

assigning path numbers to all of the first paths or the second paths extracted, detecting an observed event, which block the first path or the second path, from the plurality of observed events, associating an observed event detected with a path number of the first path or the second path blocked by the observed event, and obtaining a minimal set covering of all assigned path numbers from observed events to which path numbers are associated.

12. The non-transitory computer-readable recording medium according to claim 9, wherein the decision graph is constructed by a grounding operation based on Herbrand universe of the knowledge base.

* * * * *